US005833469A

United States Patent [19]

Ito et al.

[11] Patent Number: 5,833,469

[45] Date of Patent: Nov. 10, 1998

[54] METHOD OF OPERATING A KARAOKE NETWORK SYSTEM WITH SYSTEM PROGRAM DISTRIBUTION AND KARAOKE NETWORK SYSTEM

[75] Inventors: Emi Ito; Kanehisa Tsurumi, both of Hamamatsu; Yuichi Murai, Shinagawa-ku, all of Japan

[73] Assignee: Yamaha Corporation, Hamamatsu, Japan

[21] Appl. No.: 621,842

[22] Filed: Mar. 22, 1996

[30] Foreign Application Priority Data

Mar. 28, 1995 [JP] Japan .................................... 7-069925

[51] Int. Cl.[6] .............................. G09B 15/06; G10H 7/00

[52] U.S. Cl. .................................. 434/307 A; 434/307 R; 455/6.3; 84/609; 84/477 R; 364/130

[58] Field of Search ....................... 434/118, 307 R–309, 434/318, 365; 84/423 R, 454, 477 R, 601, 603, 609–611, 615, 625, 630, 631, 645; 369/22, 34, 48, 50, 83, 178, 192; 360/1.9, 33.1, 32, 49, 69, 70, 77.01, 98.04; 348/448, 552, 571, 678, 17, 7; 345/141, 143, 147; 381/81; 386/55, 97, 105; 455/15, 515, 4.2, 5.1, 6.3; 379/93.14, 93.05, 93.17; 395/183.21, 701, 761; 364/138, 130

[56] References Cited

U.S. PATENT DOCUMENTS

| | | | |
|---|---|---|---|
| 4,736,406 | 4/1988 | Molnar | 379/93.14 |
| 4,868,376 | 9/1989 | Lessin et al. | 235/492 |
| 5,335,073 | 8/1994 | Yamamoto | 434/307 A |
| 5,339,406 | 8/1994 | Carney et al. | 395/183.21 |
| 5,397,853 | 3/1995 | Koguchi | 434/307 A |
| 5,485,142 | 1/1996 | Stute et al. | 364/138 X |
| 5,597,307 | 1/1997 | Redford et al. | 434/118 |
| 5,613,192 | 3/1997 | Ikami et al. | 455/4.2 |
| 5,616,876 | 4/1997 | Cluts | 434/307 A X |
| 5,644,355 | 7/1997 | Koz et al. | 348/17 |
| 5,652,400 | 7/1997 | Fujimori et al. | 84/645 X |

*Primary Examiner*—Joe Cheng
*Attorney, Agent, or Firm*—Loeb & Loeb LLP

[57] ABSTRACT

A karaoke network system includes a host computer and a plurality of karaoke stations connected to the host computer via a communication line. When a new karaoke station is added to the karaoke network system or when a system program to be used by each of the karaoke stations is upgraded, a new system program is distributed from the host computer to the specified karaoke stations, Each of the karaoke stations has a first storage device for storing the new system program received from the host computer, and a second storage device that stores a system program currently executed to operate each of the karaoke stations. After rebooting each of the karaoke stations and thereafter, each of the karaoke stations is operated with the newest system program.

12 Claims, 3 Drawing Sheets

METHOD OF OPERATING A KARAOKE NETWORK SYSTEM WITH SYSTEM PROGRAM DISTRIBUTION AND KARAOKE NETWORK SYSTEM

BACKGROUND OF THE INVENTION

1. Field of the Invention

Embodiments of the present invention relate to a karaoke network system that includes a karaoke station and a host computer. The karaoke station is connected to the host computer via a communication line that supplies song data from the host computer to the karaoke station.

2. Description of Related Art

In recent years, karaoke systems have become very popular, and there are an increasing number of demands among users for a larger number of song titles as the number of users of karaoke systems increase. Under these circumstances, karaoke network systems are gaining popularity. A typical karaoke network system includes a host computer that maintains a large amount of song data as a data base, and supplies song data through a communication line to a karaoke station that is installed in a business establishment, for example, a bar, a club and the like.

In the karaoke network systems of the type described above, each business establishment can utilize a large amount of song data that is maintained at the host computer. As a result, this system can meet the users' demands for a large number of song titles, and allows each individual business establishment to promptly add song data of newly released songs.

In a typical karaoke network system, a karaoke station that is installed at an individual business establishment has a ROM (read only memory) that stores a system program and an internal CPU (central processing unit) that executes the system program stored in the ROM to carry out various control operations. Therefore, when the system program is required to be modified, for example, when the system program is upgraded, maintenance personnel prepare a ROM that stores an upgraded system program, visit each individual business establishment, and exchange the ROM mounted in the karaoke station with the new upgraded ROM. Accordingly, the typical karaoke network system requires a large amount of system maintenance.

SUMMARY OF THE INVENTION

It is an object of the present invention to provide a karaoke network system that lowers the system maintenance, for example, when a system program of the karaoke network system is upgraded.

In accordance with an embodiment of the present invention, a karaoke network system includes a host computer and a plurality of karaoke stations connected to the host computer through a communication line. Each of the karaoke stations reproduces a song representative of song data that is supplied from the host computer. The reproduced song is mixed with a vocal sound that is picked up by a microphone to provide a mixed sound. In one embodiment, the host computer transmits a system program to be executed by an individual karaoke station to each of the karaoke stations. Each of the karaoke station executes the system program supplied from the host computer to control operations of the karaoke station, such as reproduction of songs, control of various devices and the like.

In accordance with another embodiment of the present invention, a karaoke network system includes a host computer and at least one karaoke station connected to the host computer through a communication line. The karaoke station reproduces a song representative of song data that is supplied from the host computer. The reproduced song is mixed with a vocal sound that is picked up by a microphone to provide a mixed sound. In one embodiment, the host computer includes a system program transmission device that transmits a system program to the karaoke station. The karaoke station includes a boot storage device that stores a boot program, a first memory device that stores a first system program that is being executed, a system program receiving device that receives a second system program that is transmitted from the host computer, and a second memory device that stores the second system program. When the karaoke station is rebooted after the second system program has been received, the karaoke station reads the second system program from the second memory device according to the boot program, writes the second system program in the first memory device and replaces the first system program with the second system program. As a result, the karaoke station can be upgraded to a newer system program with reduced maintenance because the system program is supplied from the host computer through the network.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings.

DETAILED DESCRIPTION OF EMBODIMENTS

The present invention is hereunder described with reference to the accompanying drawings.

Figure 1:
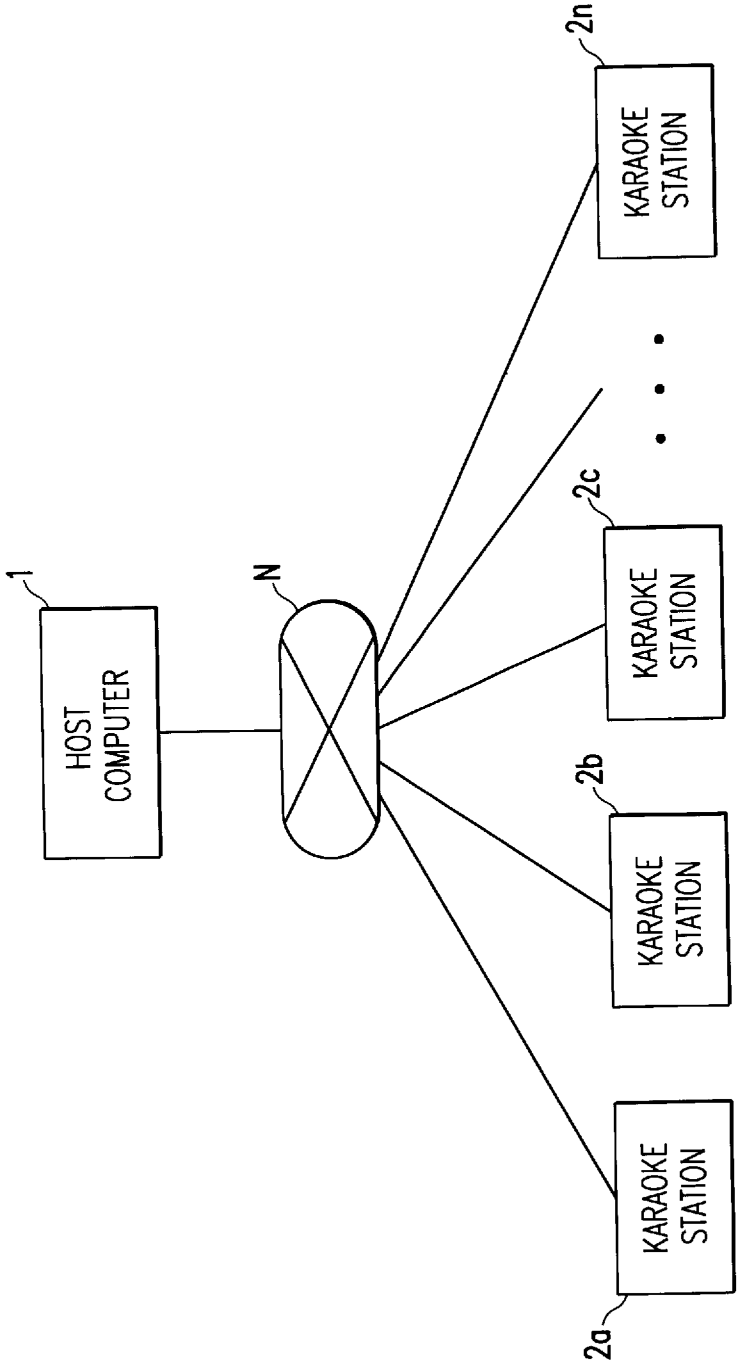
FIG. 1 shows a block diagram of a karaoke network system in accordance with one embodiment of the present invention.

FIG. 1 shows a block diagram of a karaoke network system in accordance with an embodiment of the present invention. A host computer 1 has a database that stores karaoke song data. The host computer 1 is connected to a plurality of karaoke stations 2*a*, 2*b*, 2*c*, . . . 2*n* through a communication line N. Song data is transferred from the host computer 1 to each of the karaoke stations 2*a*, 2*b*, 2*c*, . . . 2*n* via the communication line. In alternative embodiments, the host computer may be connected to each of the karaoke stations by other communication devices, such as radio transmitters, phone lines, ISDN networks, Ethernet, satellite relays or the like. In an embodiment, each of the karaoke stations 2*a*, 2*b*, 2*c*, . . . 2*n* has a storage device for storing the song data transferred from the host computer 1.

Each of the song data includes performance data for reproducing a performance for each song, a song code that specifies the song, lyric data for displaying lyric characters on a display device with the progression of the song. A unit of song data for several songs is, for example periodically, supplied from the host computer 1 to each of the karaoke stations 2a, 2b, 2c . . . 2n. When the host computer 1 transmits song data to each of the karaoke stations 2a, 2b, 2c . . . 2n, the host computer also transmits version management data that specifies the version of the song data.

The host computer 1 also maintains a system program that is to be executed at each of the karaoke stations 2a, 2b, 2c, . . . 2n, and the host computer 1 distributes the system program through the communication line N to each of the karaoke stations. The system program includes a variety of software, such as for example, a sequencer program that interprets the song data and controls the reproduction of songs, a data base manager that manages a data base at the karaoke station, device drivers that control various devices, such as communication interfaces, and the like. Each of the karaoke stations 2a, 2b, 2c . . . 2n accomplishes their respective functions by executing the system program that is supplied from the host computer 1. When the host computer 1 transmits a system program to each of the karaoke stations 2a, 2b, 2c . . . 2n, the host computer adds version management data that specifies the version of the system program, in a similar manner as described above with respect to the song data.

Figure 2:
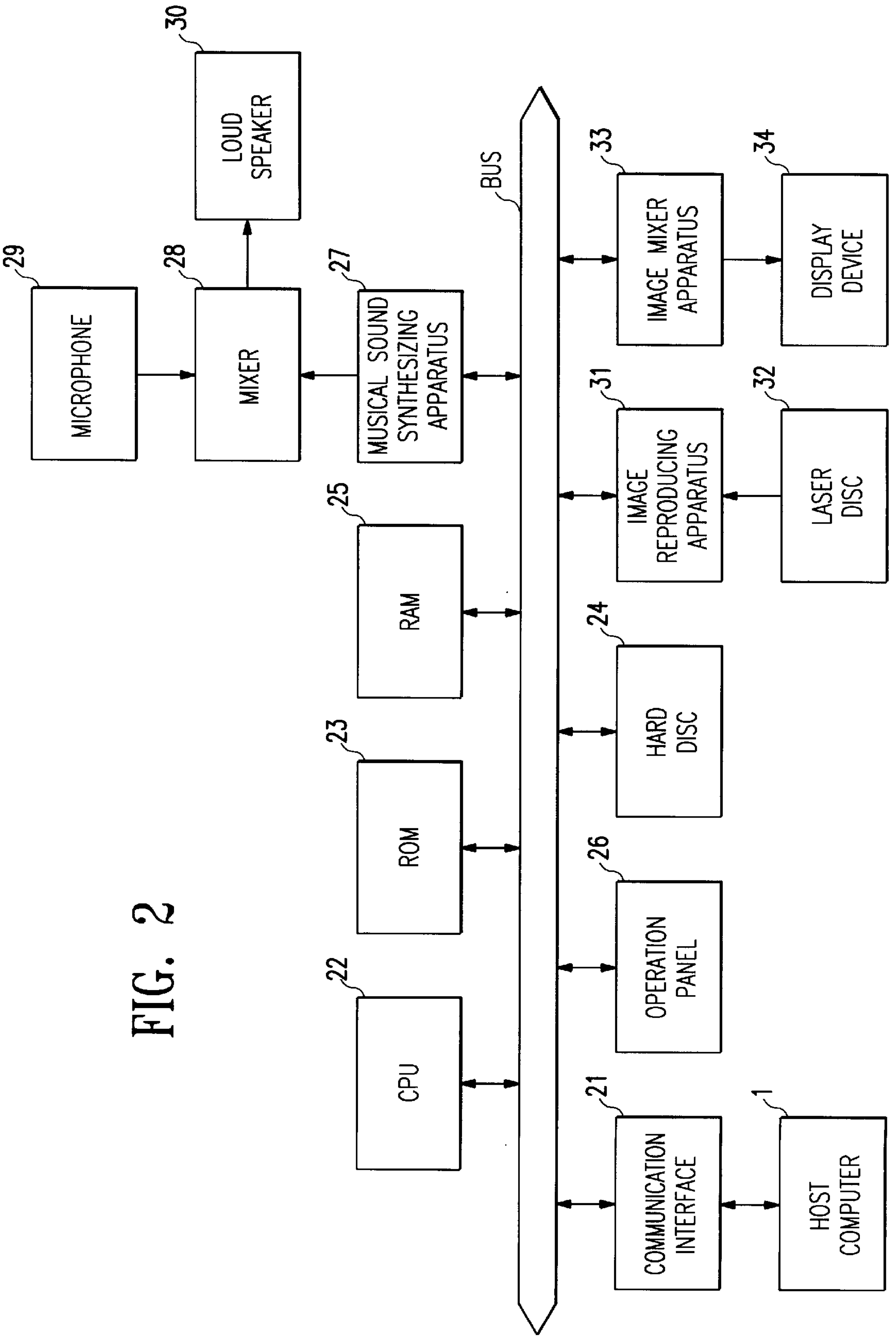
FIG. 2 shows a block diagram of a karaoke station in accordance with the embodiment of the present invention shown in FIG. 1.

Referring to FIG. 2, reference numeral 21 denotes a communication interface, such as a modem, an ISDN (integrated services digital network), and the like, that is connected to the host computer 1 through a communication line N. Reference numeral 22 denotes a CPU (central processing unit) that executes a system program supplied from the host computer 1, and controls various devices connected via a data bus BUS.

Rreference numeral 23 denotes a ROM (read only memory) that stores a boot loader program for starting the system, and font data for displaying characters of a lyric for a song. Reference numeral 24 denotes a hard disc that stores song data and a system program which are supplied from the host computer 1, and a version management table for the song data and the system program. Further, reference numeral 25 denotes a RAM (random access memory) that is used as a work area for the CPU 22 and stores the system program which is loaded from the hard disc 24, and for song data which is designated to be reproduced. Also, the RAM 25 allocates temporary memory regions that temporarily store stack regions and system variables.

Figure 3:
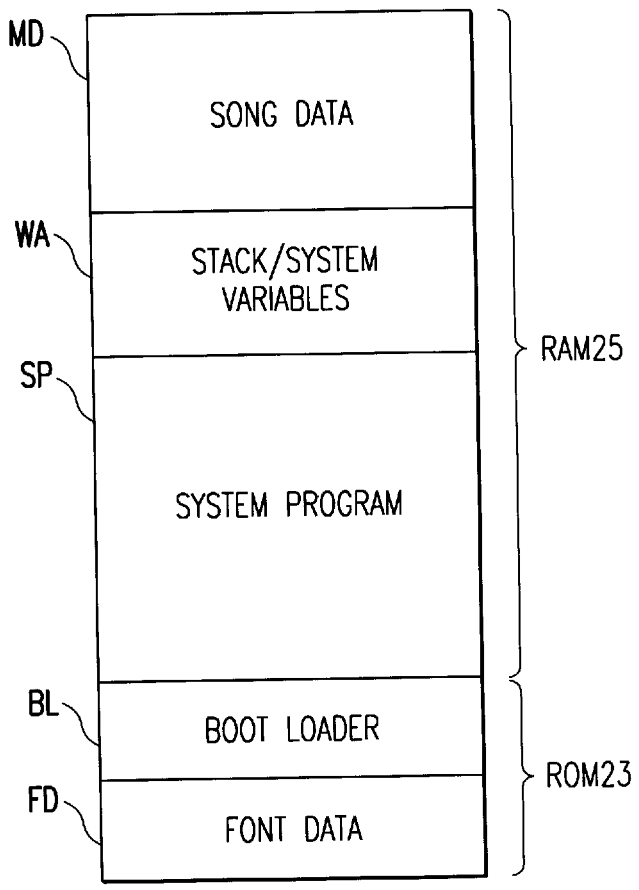
FIG. 3 shows a memory map composed of a ROM and a RAM mounted in a karaoke station in accordance with an embodiment of the present invention.

For example, as shown in FIG. 3, the ROM 23 and the RAM 25 define a memory space including regions for storing font data FD, song data designated to be reproduced MD, stack/system variables WA, a system program SP and a boot loader program BL. In the illustrated embodiment, the font data FD and the boot loader program BL are stored in different regions in the ROM. However, the font data FD and the boot loader program BL may be stored in two separate ROMs.

Reference numeral 26 denotes a control panel that detects various input operations performed by a user, and outputs a detection signal representative of each of the input operations to the CPU 22. The user operates the control panel 26 to select a song, start and stop a performance, designate a specified loudness and designate a specified tempo, as well as to communicate with the host computer 1.

Reference numeral 27 is a musical sound synthesizing apparatus that generates a musical sound signal corresponding to the performance data (that is included in the song data) that is successively supplied by the CPU 22, and outputs the musical sound signal to a mixer 28. The mixer 23 mixes the musical sound signal supplied from the musical sound synthesizing apparatus 27 and a vocal signal picked up by a microphone 29 to provide a mixed signal, and causes one or more loudspeakers 30 to generate a sound representative of the mixed signal.

Reference numeral 31 denotes an image reproduction apparatus that reads image data, that corresponds to the song data designated to be reproduced, from a laser disc 32, and transfers the image data to an image mixer apparatus 33. The image mixer apparatus 33 mixes the image data supplied from the image reproduction apparatus 31 and font data corresponding to the lyric data (that is included in the song data) that is supplied by the CPU 22, and causes a display device 34 to display an image representative of the image data and the font data.

Next, an operation of a karaoke network system in accordance with an embodiment of the present invention is described.

(1) DISTRIBUTION OF SYSTEM PROGRAM

When a karaoke station is newly installed or a current system program for a karaoke station is upgraded, the host computer 1 distributes a new system program to each of the karaoke stations 2a, 2b, 2c . . . 2n. The system program is transferred and received between the host computer 1 and each of the karaoke stations 2a, 2b, 2c . . . 2n according to a procedure described below.

① Communication is established between the host computer 1 and one of the karaoke stations (a first karaoke station) in accordance with a specified protocol.

② When the communication is established between the host computer 1 and the first karaoke station, the host computer 1 adds version management data to a system program that is to be distributed, and then transmits the system program together with the version management data to the first karaoke station.

③ The first karaoke station receives the system program and the version management data transferred from the host computer 1 through the communication interface 21.

④ The CPU 22 mounted in the first karaoke station stores the system program and the version management data on the hard disc 24. In alternative embodiments, the system program and the version management data may be stored in other storage media, such as for example, a floppy disc. If a system program of an old version is stored on the hard disc 24, the new system program is stored in a region separated from the old version of the system program. The version management data is stored in a version management table that is provided in a specified region in the hard disc 24. Further, the CPU 22 sets a reboot flag for controlling a timing to reboot (described later) the first karaoke station, and starts a time measurement by an internal timer (not shown).

Steps ① through ④, as described above, are repeated for each of the karaoke stations 2a, 2b, 2c, . . . 2n to complete the process of distributing the new system program. It is noted that if a karaoke station is newly added, for example, as a result of opening a new bar house that installs the karaoke station, or if only a part of the karaoke stations in the karaoke network system are upgraded, the above steps ① through ④ are repeated for only these particular karaoke stations.

In the embodiment described above, an entire system program is distributed. However, in alternative embodiments, a system program may be distributed in any one of desired manners. For example, a part of a system program that is desired to be modified may be selectively distributed.

(2) DISTRIBUTION OF SONG DATA

Next, a distribution procedure for distributing song data is described. Distribution of song data is carried out, for example, when the number of new songs stored in the host computer 1 has reached a predetermined level, or when a predetermined time has elapsed since the last song data distribution. The song data distribution procedure is carried out in a similar manner as described above with respect to the system program distribution procedure. Namely, communication is first established between the host computer 1 and a first one of the karaoke stations (a first karaoke station) in accordance with a specified protocol. Then, when the communication is established between the host computer 1 and the first karaoke station, the host computer 1 adds version management data to the song data that is to be distributed, and transmits the song data together with the version management data to the first karaoke station. The first karaoke station receives the song data and the version management data transferred from the host computer 1 through the communication interface 21. Then the CPU 22 mounted in the first karaoke station stores the song data and the version management data on the hard disc 24. It is noted that the version management data in this case is data that specifies a group of files contained in the song data representative of a song that is newly released. The song data distributed to each of the karaoke stations is added to song data that is already existing on the hard disc 24 in each of the karaoke stations, and the version management data is written in a song data version management table allocated on the hard disc 24.

Song data is distributed, for example, when a new song is released, or when a karaoke network system is newly installed, in a similar manner described above with respect to the system program. Also, song data may be distributed only to a specified karaoke station, for example, when a new karaoke station is added to an existing karaoke network system. A variety of transmission formats for transmitting song data, for example, MIDI (musical instrument digital interface) may be used.

(3) REBOOTING THE KARAOKE STATION

Next, a reboot operation for the karaoke stations 2*a*, 2*b*, 2*c*, . . . 2*n* is described. Reboot timing for a karaoke station varies depending on the state of a power supply to the karaoke station at a time when a system program is distributed. In other words, the reboot timing for a karaoke station may vary depending on whether or not the karaoke station is being operated when a system program is distributed (i.e., the karaoke station is on and in communication with the host station.)

If a system program is distributed when a karaoke station (for example, 2*a*) is not operated and only the CPU 22 is active, for example, when a bar house or the like that installs the karaoke station 2*a* is not in business, the CPU 22 sets the above described reboot flag and then immediately performs the reboot operation. More particularly, the CPU 22 activates the boot loader program that is stored in the ROM 23, loads the distributed system program from the hard disc 24 to the RAM 25. In this instance, if the hard disc 24 stores system programs in a plurality of versions, the system program version management table is referred to so that the newest version of the system program is loaded. When a main routine of the system program is started, the communication interface 21 and system variables are initialized, and scanning of the control panel 26 is started. After the reboot operation, the karaoke station 2*a* operates using the newest system program.

On the other hand, when a system program is distributed while the power to the karaoke station 2*a* is on, the CPU 22, after the system program has been distributed, periodically observes an elapse of time measured by a timer (not shown) and determines whether or not there has been an operation to designate the karaoke performance during the measured elapse of time. The CPU 22 performs the reboot operation if a determination is made that reproduction of songs has not been performed (namely, the karaoke station 2*a* has not been used) for a predetermined period of time. After the reboot operation, the karaoke station 2*a* is operated with the newest system program.

Furthermore, the karaoke station 2*a* may be rebooted when the power to the CPU 22 is once turned off and turned on again, or when the power is momentarily shut off due to a thunderbolt or the like.

(4) REPRODUCTION OF SONG

Next, a song reproduction operation performed by each of the karaoke stations 2*a*, 2*b*, 2*c* . . . 2*n* is described. First, using the operation panel 26, a user selects a song, and designates the start of a performance. The CPU 22 transfers song data representative of the selected song from the hard disc 24 to the RAM 25. Then, the CPU 22 successively interprets the song data, supplies performance data, that is included in the song data, to the musical sound synthesizing apparatus 27 to generate a musical sound signal, and transfers font data corresponding to the song data from the RAM 25 to the image mixer apparatus 33.

On the other hand, the CPU 22 supplies a song code, that is included in the song data, to the image reproduction apparatus 31. The image reproduction apparatus 31 reads out image data corresponding to the song data from the laser disc 32, supplies the image data to the image mixer apparatus 33.

The mixer 28 mixes the musical sound signal generated by the musical sound synthesizing apparatus 27 and a vocal signal picked up by the microphone 29 to generate a mixed signal. The mixed signal is then outputted by the loudspeaker 30. Also, the image data and the font data of the song lyric are mixed by the image mixer apparatus 33, and an image representative of the image data and characters corresponding to the font data are displayed on the display device 34 as the song progresses.

In accordance with embodiments of the present invention, a system program, that is executed by each of the karaoke stations 2*a*, 2*b*, 2*c* . . . 2*n* is distributed from the host computer 1 that also supplies song data to each of the karaoke stations 2*a*, 2*b*, 2*c* . . . 2*n* As a result, when the system program is upgraded to a new version, the works that may be required for introducing the new system program and changing the ROM 23 can be eliminated, and thus the work load required to maintain the karaoke network system can be alleviated. Also, in the above embodiment, after a new system program has been distributed to a karaoke station, the karaoke station is automatically rebooted when the karaoke station is not used, and the karaoke station operates with the new system program after the rebooting.

While the description above refers to particular embodiments of the present invention, it will be understood that many modifications may be made without departing from the spirit thereof. For example, in accordance with the illustrated embodiment, song data and system programs are distributed from a host computer to karaoke stations through a public telephone line or an ISDN. In alternative embodiments, the present invention is applicable to a system using a local area network, such as a karaoke box system in which specialized karaoke rental rooms are connected through a local area network. Furthermore, in accordance with the illustrated embodiment, when a distributed new system program is stored on the hard disc 24, an old system program currently being stored is not eliminated, but instead the new system program is added to the currently stored old system program. However, in an alternative embodiment, the currently stored old system program may be replaced with the new system program. As a result, the amount of memory region required to store a system program is reduced. In this case, only the newest version of a system program exists on the hard disc 24, and accordingly, the system program version management data may not be needed. Accordingly, the accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of operating a karaoke network system including a communication line, a host computer and a plurality of karaoke stations connected to the host computer via the communication line, the method comprising the steps of:

transmitting a system program from the host computer via the communication line to at least one of the plurality of karaoke stations;

transmitting song program data from the host computer via the communication line to at least one of the plurality of karaoke stations;

wherein the system program and the song program data are independently transmitted via the communication line to the at least one of the plurality of karaoke stations; and executing within the at least one of the plurality of karaoke stations the system program supplied from the host computer to generate a sound in accordance with the song program data.

2. A method of operating a karaoke network system according to claim 1, further comprising the step of receiving the system program by a first storage area provided separately from a second storage area, the second storage area storing an old system program that is currently operating each of the karaoke stations.

3. A method of operating a karaoke network system according to claim 2, further comprising the steps of rebooting the at least one of the plurality of karaoke stations thereby selecting for execution a newest version of the system program; and executing within the at least one of the plurality of karaoke stations the newest system program.

4. A method of operating a karaoke network system including a communication line, a host computer, and a plurality of karaoke stations connected to the host computer via the communication line, the method comprising the steps of:

transmitting a system program from the host computer to at least one of the plurality of karaoke stations;

storing a first system program in the at least one of the plurality of karaoke stations which is currently executed;

receiving a second system program in the at least one of the plurality of karaoke stations that is transmitted from the host computer; and detecting an operational state of the at least one of the plurality of karaoke stations and, upon detecting an appropriate operational state in which the at least one of the plurality of karaoke stations is not reproducing songs, causing the at least one of the plurality of karaoke stations to execute the second system program.

5. A method of operating a karaoke network system according to claim 4, wherein the step of causing the at least one of the plurality of karaoke stations to execute the second system program includes the steps of:

rebooting the at least one of the plurality of karaoke stations after the at least one of the plurality of karaoke stations has received the second system program;

reading out the second system program; and rewriting the second system program to replace the first system program.

6. In a karaoke network system including a communication line, a host computer, and a plurality of karaoke stations connected to the host computer via the communication line, the improvement comprising:

a system program transmission device that transmits a system program from the host computer to at least one of the plurality of karaoke stations;

a song program data transmission device that transmits song program data from the host computer to at least one of the plurality of karaoke stations independently of transmission of the system program:

a boot storage device in each of the plurality of karaoke stations that stores a boot program;

a first storage device in each of the plurality of karaoke stations that stores a first system program;

a system program receiving device in each of the plurality of karaoke stations that receives a second system program that is transmitted from the host computer; and a second storage device in each of the plurality of karaoke stations that stores the second system program.

7. A karaoke network system according to claim 6, wherein at a time of reboot after the at least one of the plurality of karaoke stations has received the second system program, the at least one of the plurality of karaoke stations reads out the second system program from the second storage device according to the boot program, rewrites the second system program in the first storage device for replacing the first system program, and operates the at least one of the plurality of karaoke stations according to the second system program.

8. A karaoke network system comprising:

a communication line;

a host computer, the host computer including a system program transmission device that transmits a system program and a song data transmission device that transmits song data; and a plurality of karaoke stations connected to the host computer via the communication line, each of the plurality of karaoke stations including:

a boot storage device in each of the plurality of karaoke stations that stores a boot program;

a memory area in each of the plurality of karaoke stations that stores a first system program that is executed to allow each of the plurality of karaoke stations to reproduce sound according to the song data;

a system program receiving device in each of the plurality of karaoke stations that receives a second system program transmitted from the host computer;

a system program storage area in each of the plurality of karaoke stations that stores the second system program;

an automatic reboot system, operable after the system program receiving device receives the second system program and when an associated karaoke system is not reproducing sound, the automatic reboot system causing an associated karaoke station to reboot and to reproduce sound according to the song data and the second system program.

9. A karaoke network system according to claim 8, wherein the memory area is formed by a first memory device and the system program storage area is formed by a second memory device separated from the first memory device.

10. A karaoke network system according to claim 8, wherein the memory area and the system program storage area are within a single memory device.

11. A karaoke network system according to claim 8, wherein each of the plurality of karaoke stations further comprises:

a sound reproducing device that reproduces a song representative of the song data supplied from the host computer;

a microphone that picks up vocal sound; and a sound mixer device that mixes the song reproduced by the sound reproducing device and the vocal sound that is supplied from the microphone.

12. A karaoke network system according to claim 11, wherein at a time of reboot after at least one of the plurality of karaoke stations has received the second system program, the at least one of the plurality of karaoke stations reads out the second system program from the second storage device according to the boot program, rewrites the second system program in the first storage device for replacing the first system program, and executes at least one of the plurality of karaoke stations according to the second system program.

* * * * *